July 9, 1968   C. B. CALLAHAN   3,391,954
RETAINING RING APPARATUS
Filed Jan. 26, 1966
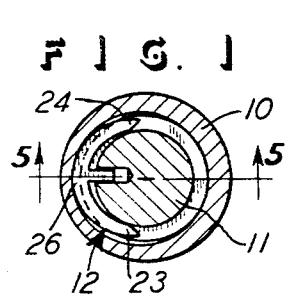
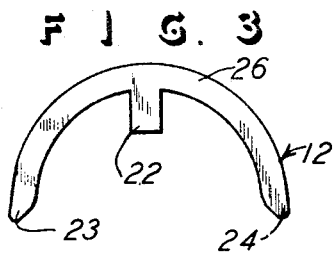
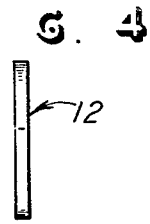
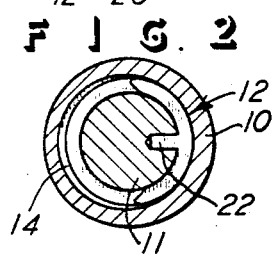
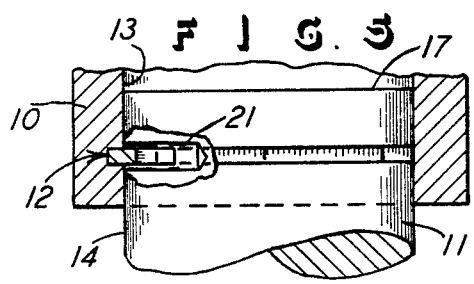
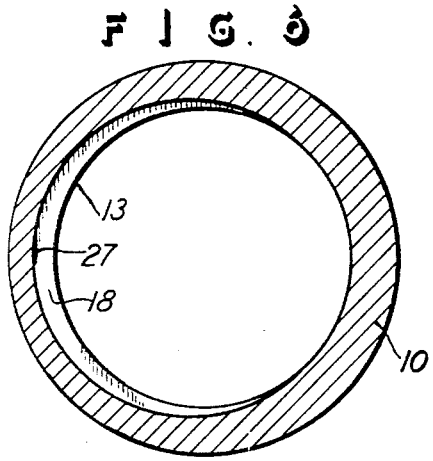
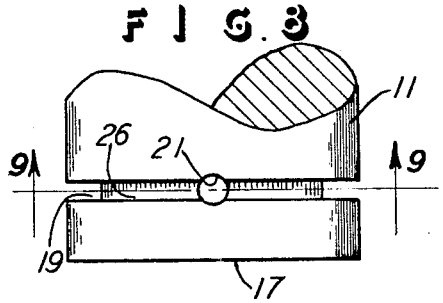
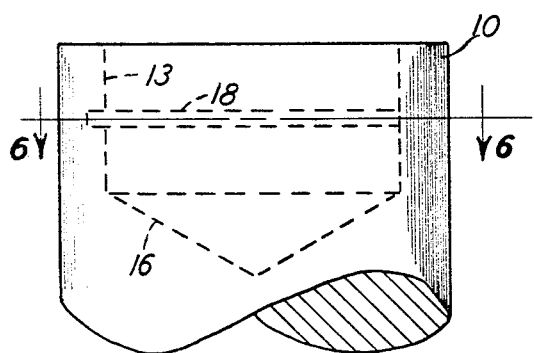
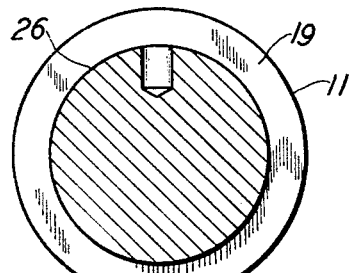
INVENTOR:
CHARLES B. CALLAHAN
ATTORNEY

United States Patent Office 3,391,954
Patented July 9, 1968

3,391,954
RETAINING RING APPARATUS
Charles B. Callahan, 4517 Taft Road,
Kenosha, Wis. 53140
Filed Jan. 26, 1966, Ser. No. 523,187
3 Claims. (Cl. 287—52.05)

ABSTRACT OF THE DISCLOSURE

Two telescopically associated pieces having aligned grooves extending between the pieces, with one of the grooves being eccentric with respect to the axes of the pieces. A retainer ring is disposed within the grooves, and the ring is rotatable with one of the pieces to move between a radially extended position in the grooves to a radially retracted position in the grooves. The ring is resilient and of only a half-circle configuration.

---

This invention relates to retaining ring apparatus wherein two pieces, such as two shafts, may be axially secured together.

Retaining rings are widely employed in securing two pieces together. The type of concern in this particular invention is that which is employed within the confines of the outer one of the two pieces, and the two pieces are telescoped together and axially retained by the ring. In rings heretofore known, many of them require special tools for at least removing the ring so that the two pieces can be separated when desired. Also, certain of the heretofore known retaining rings require a relative elaborate construction in order to perform their function of securing the two pieces together. The rings are therefore expensive to manufacture and maintain, and they require elaborate and expensive machining of the pieces themselves in order to receive the ring for its function of securing these pieces together. It is a general object of this invention to provide retaining ring apparatus which is an improvement over those heretofore known. More specifically, it is an object to provide retaining ring apparatus which is relatively easy to manufacture and is thus inexpensive and which can be readily and easily applied to the two pieces for securing them axially together.

A further object of this invention is to provide retaining ring apparatus which can be employed in a blind or dead-end bore in one piece and which can be removed from the pieces to be secured together, without the requirement of any tool whatsoever.

Another more specific object of this invention is to provide a retaining ring apparatus which can axially secure two pieces together but which can readily release the two pieces by simply rotating one of the pieces with respect to the other piece.

Still another specific object of this invention is to provide retaining ring apparatus which permits closer tolerances than that permitted by retaining ring apparatus heretofore known. This therefore results in permitting the axial securing of two pieces with one piece thereof snugly telescoped within the other piece. In accomplishing this particular object, no slots or keyways or the like are needed on either of the two pieces, and, in fact, all that is needed is the provision of a groove on each piece and interlocking means effected between the ring and one of the two pieces, and this may simply be a hole in one of the pieces and a projection on the ring itself so that the projection is received in the hole. In further achieving the overall assembly with close tolerances and snug fit described, the appearance of the entire assembly is an improvement over that heretofore known.

Still a further object of the invention is to provide retaining ring apparatus for securing two pieces axially together and permitting the two pieces to be disassembled by rotation of either of the two pieces in either direction of rotation. This particular feature is significant in many applications of the two pieces involved.

Other objects and advantages become apparent upon reading the following description in light of the accompanying drawings, wherein:

FIG. 1 is a transverse sectional view through the apparatus incorporating this invention.

FIG. 2 is a sectional view similar to FIG. 1 but with the inner piece and the retaining ring rotated 180 degrees away from the FIG. 1 position.

FIG. 3 is an enlarged plan view of the ring itself.

FIG. 4 is a side elevational view of FIG. 3.

FIG. 5 is a sectional view on an enlarged scale and having parts thereof broken away and being taken substantially on the line 5—5 of FIG. 1.

FIG. 6 is an enlarged axial view in section and showing the outer piece, and being taken on the line 6—6 of FIG. 7.

FIG. 7 is a side view of the outer piece shown in FIG. 6.

FIG. 8 is a side view of the inner piece such as that shown in FIG. 5.

FIG. 9 is a sectional view taken on the line 9—9 of FIG. 8.

The apparatus is shown to include an outer piece 10 and an inner piece 11, and it will of course be understood that it is desired to axially secure these two pieces together by means of a retaining ring generally designated 12. The ring 12 is shown to be E-shaped, and is of slightly less than a half-circle, for a purpose hereinafter described.

The outer piece 10 has a circular bore 13, and the inner piece 11 is circular in its outer circumference 14 so that the two pieces are snugly telescoped together, as shown for instance in FIG. 5.

It is important to note that the inner bore 13 is actually a dead-end or blind bore having an end wall 16 as shown in FIG. 7. This of course therefore means that the lower portion of the outer piece 10, that is below the end wall 16, is solid and thus access to the bore 13 through the lower end of the piece 10 by means of a tool or the like is impossible. This is significant with respect to assembly and disassembly of the ring 12 with respect to the pieces 10 and 11 in that no tool can be used in this particular arrangement of the pieces 10 and 11 and such arrangement is frequently dictated by the application of the pieces and thus other provision must be made for disassembly of the pieces since a tool cannot be used to reach the ring 12. Of course this also means then that the inner piece 11 has an end wall 17 disposed within the limits of the bore 13, as shown in FIG. 5.

Thus the pieces 10 and 11 may be axially movable with respect to each other and separated from each other, and they are snugly telescoped together but may be rotated in either direction, one with respect to the other. To axially secure the pieces together, the ring 12 is disposed within registered grooves 18 and 19 formed in the pieces 10 and 11 respectively. The groove 19 is shown to extend completely around the inner piece 11, and the groove 18 is shown to be crescent shaped in FIG. 6 and extends only part way around the interior 13 of the outer piece 10. The retaining ring 12 is of course a half-ring so that it is disposed in the groove 18 when the pieces are in the rotated position shown in FIG. 1. This of course axially secures the pieces together as desired. However, when the pieces are placed in the rotated position shown in FIG. 2, and that position may have been achieved by 180 degree rotation of the inner piece 11, then the half-ring 12 is free of the groove 18, and the pieces can then be moved axially away from each other.

It will of course be seen that the inner piece 11 has an opening 21 extending radially therein and registered with the groove 19. The ring 12 has a tang or projection 22 which is disposed within the opening 21 and therefore provides an interlocking connection between the piece 11 and the ring 12 so that the latter will rotate with the rotation of the piece 11 to assume the FIG. 1 and FIG. 2 position. Also, FIG. 5 shows that the height of the ring 12 is substantially the same as the height of the aligned grooves 18 and 19 so that the pieces are snugly axially secured together.

The ring 12 is made of a spring type material so that the two legs 23 and 24 can actually move toward and away from each other within the limits of elasticity of the spring material. Thus the ring is arranged so that the legs 23 and 24 are normally urged toward each other in a manner that the ring legs are always in contact with the wall 26 defining the base of the groove 19. This is shown in both FIGS. 1 and 2. Since the ring 12 is a half-ring, this shape of the ring and characteristic of the resiliency will cause the ring to move away from the inner piece 11, at the ring's intermediate portion 26, as shown in FIG. 1. This feature therefore causes the ring to achieve a position where the intermediate portion 26 abuts the outer wall 27 defining the groove 18. In this manner, the ring 12 always lies across the intersection of the projection of the bore 13 so that it provides a shear section on the ring 12 for axial securement of the pieces 10 and 11, as desired. That of course is the relationship of the ring 12 and the pieces 10 and 11 in the FIG. 1 position. It will of course be understood that in making the assembly, the ring 12 need only be pressed tightly against the inner piece 11, as it is shown in FIG. 2, and then the ring will clear the outer piece 10 and permit axial sliding of the two pieces to the assembled position at which point the then unrestrained ring 12 will be able to have its legs 23 and 24 contract to assume the FIG. 1 position.

To disassemble the apparatus, the rotation of the inner member 11 to the FIG. 2 position will cause the ring 12 to move out of the groove 18 and the legs 23 and 24 will expand as the ring intermediate portion 26 moves radially inwardly to become snug and conform to the groove wall 26 of the inner piece. This therefore still has the ring legs 23 and 24 against the wall 26 and therefore free of the groove 18 so that the two pieces 10 and 11 can be disassembled.

Of course in the FIG. 1 position, the depth of the groove 18 is less than the corresponding depth of the ring 12 so that the latter extends beyond the groove 18 and into the groove 19, and this is termed one radial position of the ring 12. Likewise, the depth of the ring 12 is no greater than the depth of the inner groove 19 so that the ring 12 can be fully reecived within the outer circumference 14 of the inner piece 11 for the assembly and disassembly described.

While a specific embodiment of this invention has been shown and described, it should be obvious that certain changes could be made in the embodiment and the invention should therefore be determined only by the scope of the appended claims.

What is claimed is:

1. Retaining ring apparatus for securing two pieces axially together, comprising a first piece with a wall defining a bore therein, a second piece snugly telescopically disposed within said bore of said first piece, said pieces each having a groove therein defined by a bottom wall and two side walls, each said groove registered with each other and shaped to present a combined total depth along one radial line emanating from the axis of said bore, and to present only the depth of one of said grooves along another radial line emanating from the axis of said bore and 180 degrees away from said one radial line, a retainer ring of an arcuate shape of less than a half circle and extending between both said grooves and intersecting said one radial line and being of a radial depth no greater than said depth of said one groove and extending in axial abutment with the side walls of said grooves of both said pieces for axially securing said pieces together, said ring being resilient and including legs at the opposite ends thereof and with the maximum free span between said legs being less than the diameter of said bottom wall of said one groove for radially outwardly spring-urging the portion of said ring intermediate said legs to displace said intermediate portion into the other groove when said ring is intersecting said one radial line, and locking means interengaged between said ring and one of said pieces for rotating said ring with the rotation of said one of said pieces with respect to the other of said pieces about said axis for movement of said ring to a rotated position intersecting said another radial line and thereby dispose said ring in only said one groove to axially free said pieces from each other.

2. The subject matter of claim 1, wherein said groove in said second piece is of uniform depth and extends circularly completely around said second piece, and said groove of said first piece is eccentric to said groove of said second piece and extends only partly around said bore in said first piece.

3. The subject matter of claim 1, wherein said second piece has a radial opening in the bottom wall of said groove and said ring is E-shaped and the center leg thereof is disposed in said radial opening for rotationally locking said ring with said second piece.

References Cited
UNITED STATES PATENTS

| | | | |
|---|---|---|---|
| 281,310 | 7/1883 | Smith | 287—53 X |
| 281,436 | 7/1883 | Birch | 287—136 |
| 469,780 | 3/1892 | Ferres | 287—52.09 X |
| 2,038,121 | 4/1936 | Miller | 287—52.09 |
| 2,835,519 | 5/1958 | Spicacci et al. | 287—52.09 |
| 3,129,777 | 4/1964 | Haspert | 285—307 X |

EDWARD C. ALLEN, *Primary Examiner.*

CARL W. TOMLIN, *Examiner.*

D. W. AROLA, *Assistant Examiner.*